United States Patent
Pruhs et al.

(10) Patent No.: US 6,322,167 B1
(45) Date of Patent: Nov. 27, 2001

(54) PROCESS AND DEVICE FOR CONTROLLING THE BRAKING FORCE DISTRIBUTION IN A VEHICLE

(75) Inventors: Uwe Pruhs, Bietigheim-Bissingen; Stefan Diehle, Korntal-Münchingen; Thomas Meier, Untergruppenbach, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/117,759
(22) PCT Filed: Sep. 4, 1997
(86) PCT No.: PCT/DE97/01940
  § 371 Date: Aug. 4, 1998
  § 102(e) Date: Aug. 4, 1998
(87) PCT Pub. No.: WO98/25805
  PCT Pub. Date: Jun. 18, 1998

(30) Foreign Application Priority Data

Dec. 11, 1996  (DE) ................................................ 196 51 460

(51) Int. Cl.$^7$ ...................................................... B60T 8/00
(52) U.S. Cl. ........................................... 303/146; 303/9.71
(58) Field of Search ................................... 303/9.71, 146, 303/147, 148, 140, 149, 186, 113.5

(56) References Cited

U.S. PATENT DOCUMENTS

| | | | |
|---|---|---|---|
| 4,494,801 | * | 1/1985 | Ohmori et al. ...................... 303/146 |
| 4,637,664 | * | 1/1987 | Arikawa ............................... 303/146 |
| 5,282,674 | * | 2/1994 | Matsuda ............................... 303/9.71 |
| 5,482,361 | * | 1/1996 | Buckhardt et al. ................. 303/9.71 |
| 5,641,209 | * | 6/1997 | Kushi et al. ........................ 303/9.71 |
| 5,813,732 | * | 9/1998 | Monzaki et al. .................... 303/146 |
| 6,012,010 | * | 1/2000 | Batistic et al. ......................... 701/72 |

FOREIGN PATENT DOCUMENTS

WO97/00749  *  1/1997  (WO) .

* cited by examiner

Primary Examiner—Matthew C. Graham
(74) Attorney, Agent, or Firm—Kenyon & Kenyon

(57) ABSTRACT

A method and an apparatus are described for controlling the braking force distribution in a vehicle between front and rear axles, such that at least while the vehicle is traveling in a curve, the braking force at the rear wheels is established individually in such a way that the difference between the velocity of that rear wheel and a front wheel velocity assumes defined values.

18 Claims, 7 Drawing Sheets

PROCESS AND DEVICE FOR CONTROLLING THE BRAKING FORCE DISTRIBUTION IN A VEHICLE

FIELD OF THE INVENTION

The present invention relates to a method and an apparatus for controlling braking force distribution in a vehicle.

BACKGROUND INFORMATION

European Patent No. 509,237 and its corresponding U.S. Pat. No. 5,281,012 describe a method and a conventional apparatus. Here, the difference is obtained between the fastest front wheel and the slowest rear wheel, and the brake pressure at the rear wheels is established in such a way that the velocity difference between the fastest front wheel and the slowest rear wheel assumes substantially a defined value. For braking operations in curves, the rear-axle brake pressure can be reduced to zero because the velocity difference becomes greater. Provision is therefore made, in the case of the known means of attaining the object, to limit the rear-axle braking pressure to a minimum value which depends on the curve radius, and to adapt the defined value for the velocity difference to the vehicle velocity.

Although these means of attaining the object satisfactorily solve the problem of braking in curves, it has been found that in some cases, especially at high curve velocities, it has limitations in terms of vehicle behavior, since a braking moment counterrotatory to the vehicle yaw moment is not generated.

SUMMARY OF THE INVENTION

An object of the present invention is to improve an electronic braking force distribution control system for braking operations in curves.

The means according to the present invention for attaining the object improve an electronic braking force distribution control system for braking operations in curves.

It is particularly advantageous that in the partial braking range, the tendency toward oversteer, when braking close to the limit curve velocity outside the ABS control range, decreases as a result of the braking moment which, in accordance with the present invention, is directed opposite to the yaw moment.

It is further advantageous that the braking force distribution control system according to the present invention is maintained even in the critical range of vehicle dynamics at high curve velocities (greater than 60 to 120 km/h).

It is further advantageous that the counterrotatory moment generated by the braking control system is not built up abruptly, but is available as the braking pressure defined by the driver increases. The vehicle is still sufficiently stabilized, while substantial advantages in terms of driving comfort result.

Moreover, advantageously, the means according to the present invention for attaining the object can be very easily adapted to different vehicles (sports cars, sedans, vans, etc.), since regulation occurs on the basis of the braking force distribution digram (adaptive behavior).

It is also advantageous that, as a result of the individual regulation of the rear axle as compared with the known "select low" regulation system, only half the pressure volume is displaced. This results in increased comfort, clearly perceptible by the driver, for pressure buildups over the entire velocity range.

It is further advantageous that no additional hardware is required in addition to the conventional (four-channel) ABS systems.

In particularly advantageous fashion, the means according to the present invention for attaining the object are utilized not only for hydraulic braking systems, but also for pneumatic and electrically controlled hydraulic and pneumatic braking systems, and for braking systems with brake application by electric motor.

DETAILED DESCRIPTION OF THE INVENTION

Figure 1:
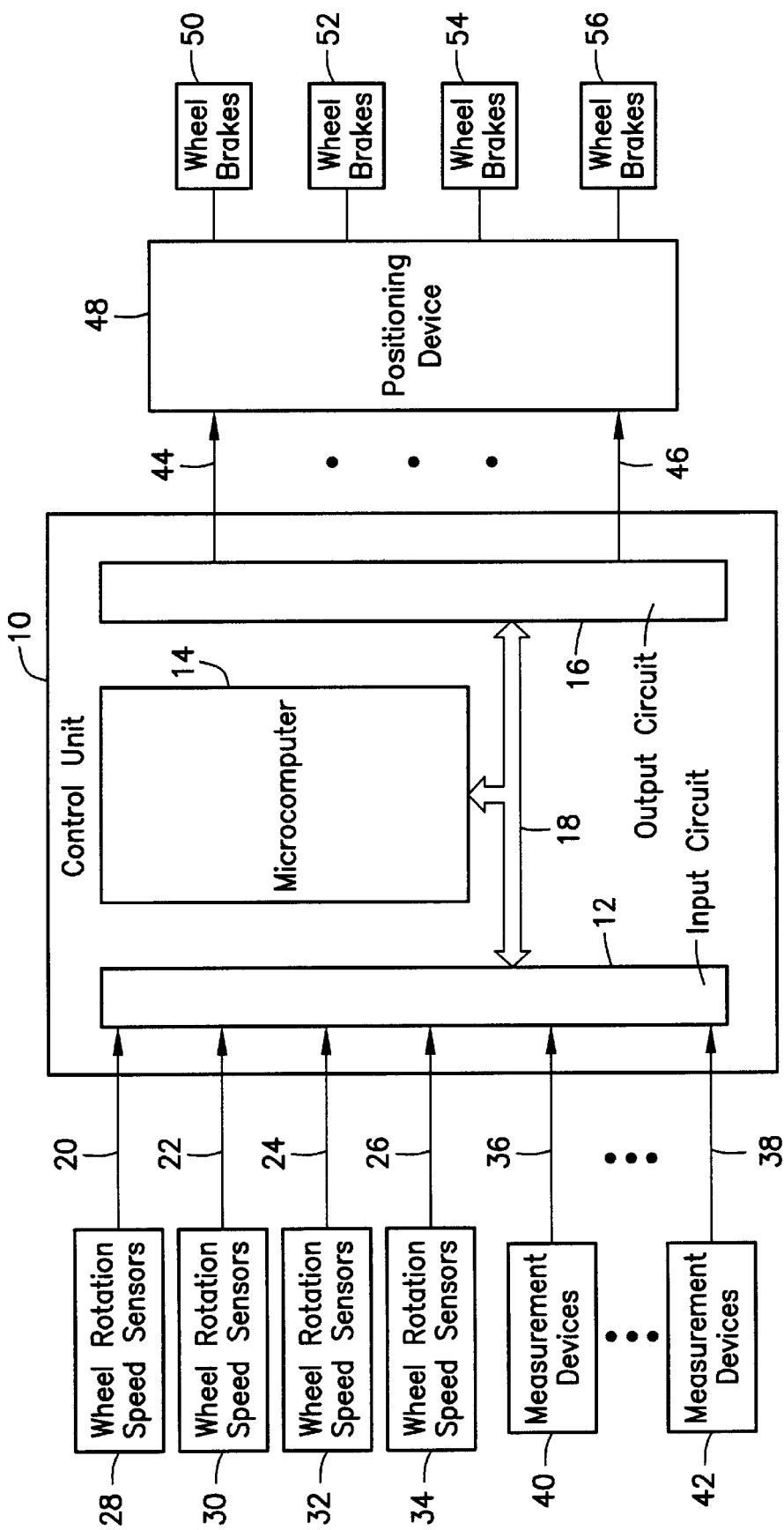
FIG. 1 shows a block diagram of a control device for controlling wheel brakes.

FIG. 1 depicts a control device for controlling the braking system of a vehicle. Control unit 10 comprises an input circuit 12, at least one microcomputer 14, and an output circuit 16. These elements are interconnected via a bus system 18 for mutual data interchange. Input lines 20, 22, 24, and 26 from wheel rotation speed sensors 28, 30, 32, and 34 are fed to input circuit 12. Also fed to it are input lines 36 to 38 from measurement devices 40 to 42. The latter sense further operating variables of the vehicle, the braking system, or the drive unit, which are analyzed in order to control the braking system. Control unit 10 influences wheel brakes 50, 52, 54, and 56 via corresponding positioning devices 48, via output lines 44 to 46 which proceed from output circuit 16. In the preferred exemplary embodiment, the braking system is a hydraulic braking system, the positioning devices 48 comprising the valve devices known from conventional AES or ABSR systems. In another exemplary embodiment, a pneumatic braking system is correspondingly provided, positioning devices 48 here again comprising the valve devices known from conventional ABS or ABSR systems or from conventional electropneumatic braking systems. The means according to the present invention for attaining the object are also, advantageously, used in braking systems with electric application. In this case positioning devices 48 comprise electric motors that are activated by control unit 10 in the context of control circuits (current, braking force, braking moment, etc.) for each individual wheel.

Control device 10, and microcomputer 14 therein, comprises programs which, in addition to the conventional functions such as ABS, ASR, etc., also regulate the braking force distribution between the front and rear axles of the vehicle. A distinction is made here between driving straight ahead and driving in curves. Curve recognition is accomplished, in this context, with procedures known in the prior art. A curve situation can, on the one hand, be identified by analyzing a steering angle sensor, a transverse acceleration sensor, and/or a yaw rate sensor, or on the other hand, using conventional actions, from the rotation speed difference of the vehicle wheels. When it is recognized that the vehicle is driving straight ahead, regulation of the rear axle, as known in the prior art, is accomplished using the "select low" principle. Thus, the rear axle brake pressure is influenced on the basis of the difference between the fastest front wheel and the slowest rear wheel. This prevents one-sided pressure reductions in the rear axle caused, for example, by surface irregularities. The yaw moment resulting from one-sided pressure reductions, which can lead to destabilization of the vehicle, is thus prevented. In contrast to this, a different control strategy is pursued when it is recognized that the vehicle is in a curve, by regulating each of the rear wheels individually. The differential velocity between each rear wheel rotation speed and the velocity of the fastest front wheel is determined, and the rear axle brake pressures are set so that a certain limit value is observed.

Individual regulation of the wheels on the rear axle while driving through a curve results in the advantages cited initially, in particular the braking moment counterrotatory to the yaw moment. The combination of these features leads to improved braking behavior, and to a gain in stability when driving either straight ahead or in a curve.

Figure 2:
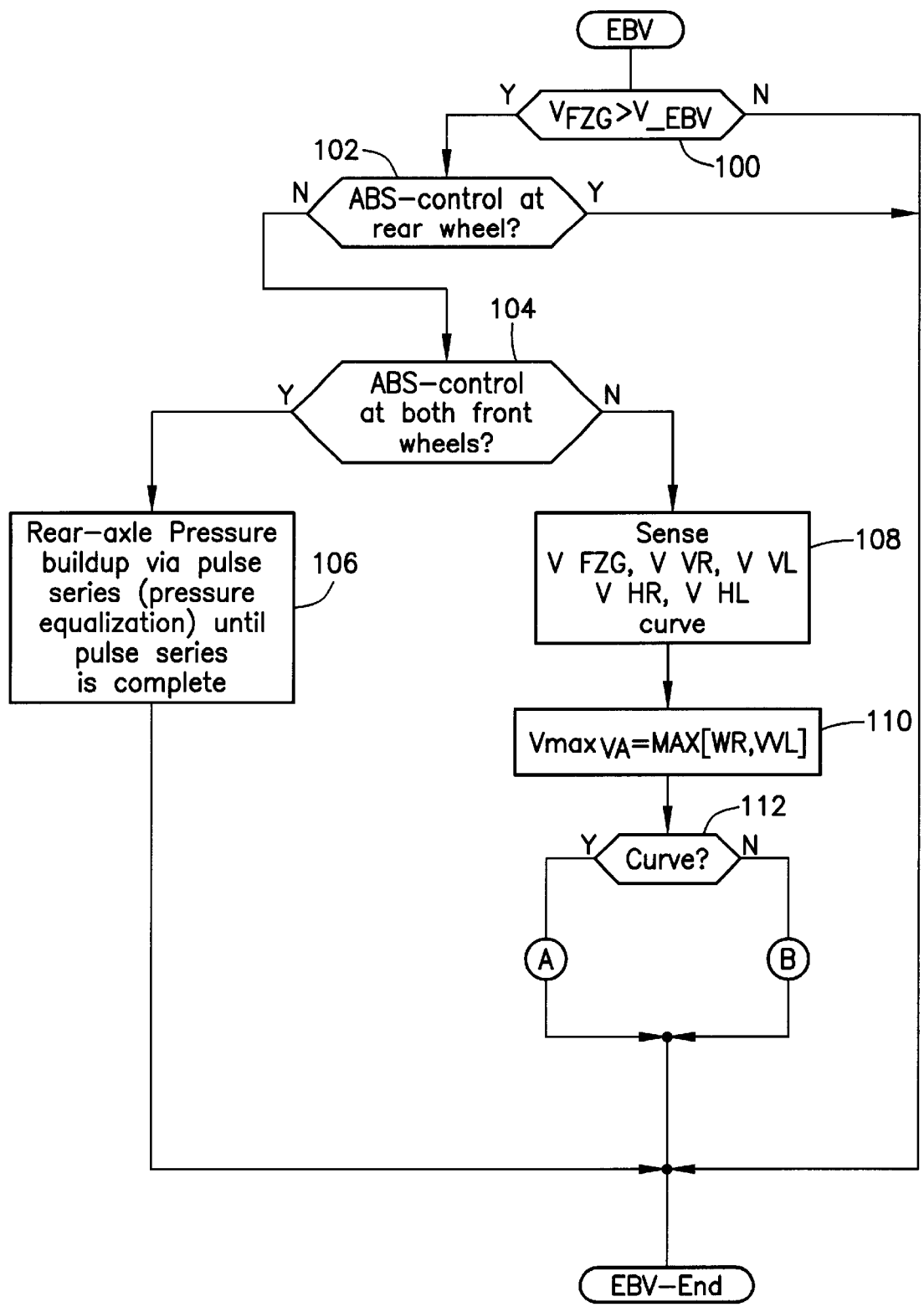
FIG. 2 shows a flow chart outlining an exemplary implementation, as a computer program, of an electronic braking force distribution control system according to the present invention.
Figure 3:
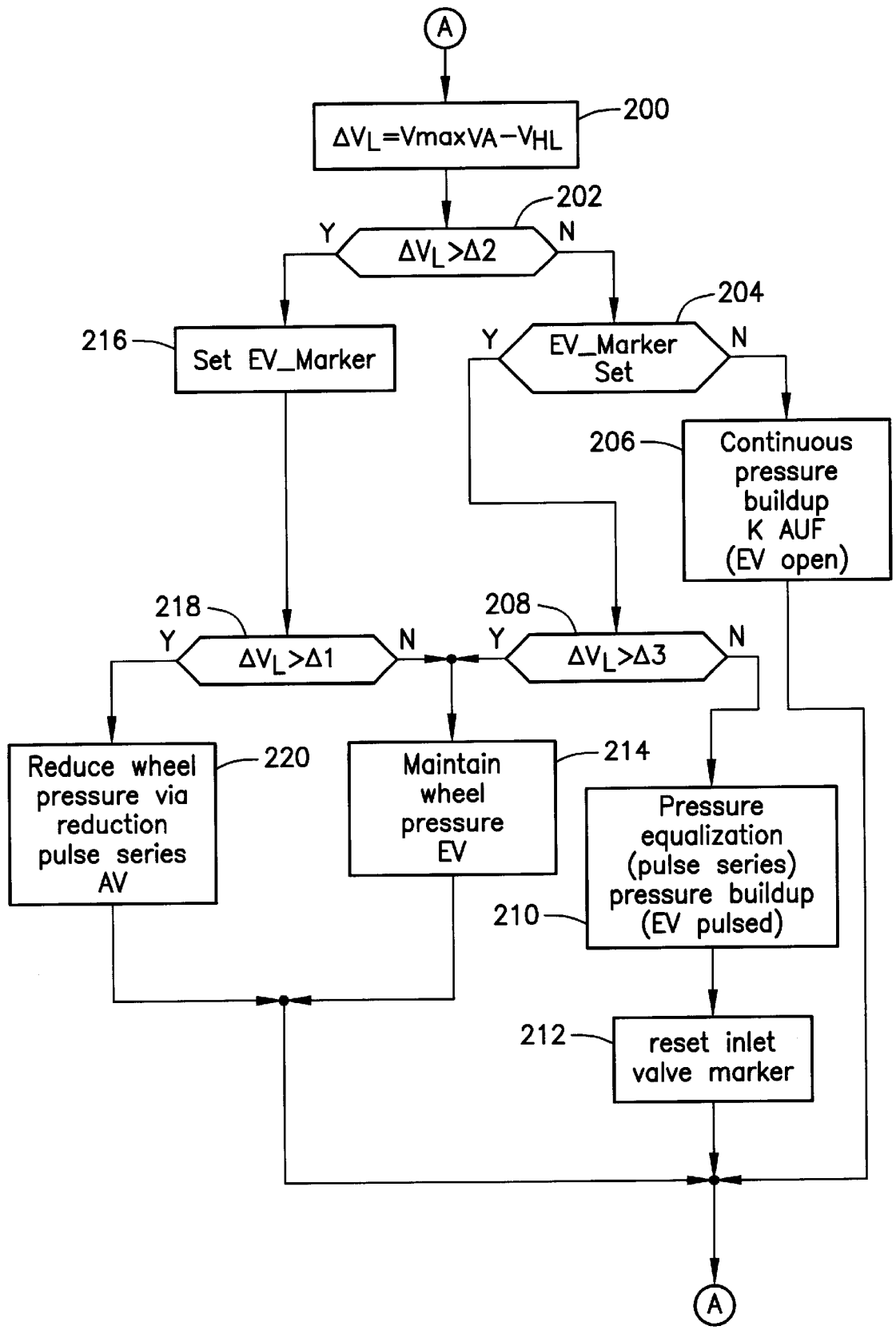
FIG. 3 shows a first exemplary embodiment of the braking force distribution control system while the vehicle is driving through a curve.
Figure 7:
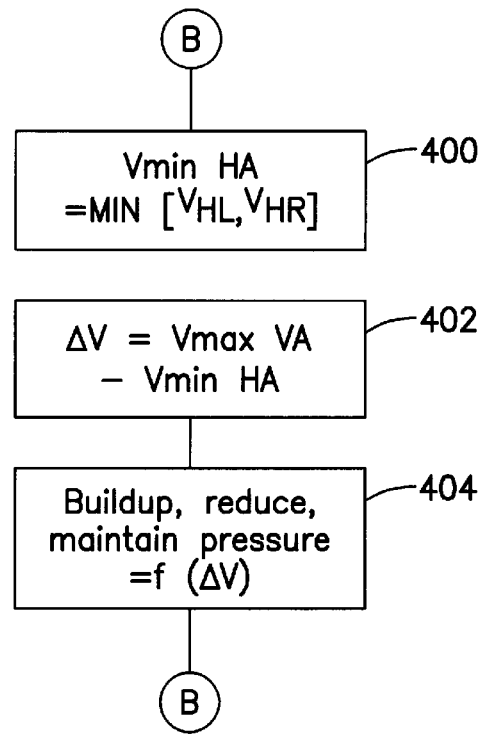
FIG. 7 shows a flow chart of the conventional braking force distribution control system while the vehicle is driving straight ahead.
Figure 5:
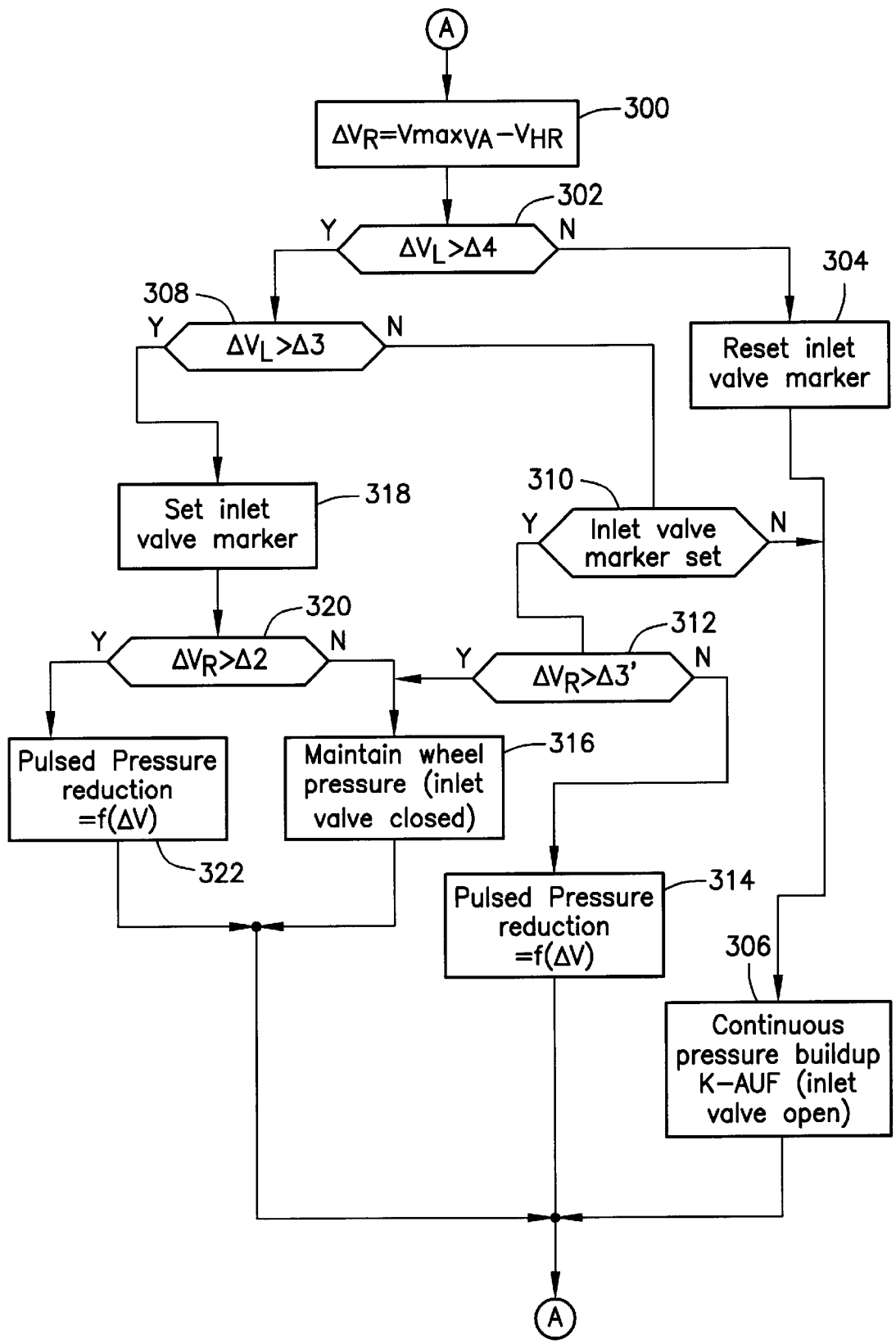
FIG. 5 shows a second exemplary embodiment of the braking force distribution control system while the vehicle is driving through the curve.

In the preferred exemplary embodiment, the means according to the present invention for attaining the object are implemented in the context of programs of microcomputer 14. FIG. 2 shows a flow chart which outlines the basic structure of the program for regulating the braking force distribution between front and rear axles. Once the program is started, the first step 100 checks whether vehicle velocity VFZG has exceeded a predefined limit value V_EBV (e.g. 3 km/h). If the vehicle velocity does not exceed the defined threshold value V_EBV, the program is terminated and is executed again at a defined time. If step 100 has indicated that the vehicle velocity is greater than the minimum regulation velocity V_EBV, the subsequent step 102 checks, on the basis of set marks, whether a rear wheel is being ABS-regulated. If so, regulation of the braking force distribution is not performed, and the program is terminated and is executed again at a defined time. If none of the rear wheels is being ABS-regulated, step 104 queries whether both front wheels are being ABS-regulated. If so, in step 106 pressure is built up at the rear axle using of a defined pulse series, in order to equalize the pressure at the rear wheels with that at the front wheels. After step 106, the program is terminated and is executed again at a defined time. If both front wheels are not being ABS-regulated, in step 108 the variables necessary for performing the regulation operation are read in: vehicle velocity VFZG, velocity of right front wheel VVR, velocity of left front wheel VVL, velocity of left rear wheel VHL, velocity of right rear wheel VHR, and information as to whether the vehicle is in a curve. In the subsequent step 110, the fastest front wheel velocity VmaxVA is determined, as a selection of the maximum value of the velocities of the right and left front wheels. Then step 112 checks whether the vehicle is driving through a curve. If not, the program section outlined in FIG. 7 is initiated in order to control rear-axle brake pressure while driving straight ahead. If the vehicle is driving through a curve, the program section depicted in FIG. 3 or 5 is initiated. After the rear-axle brake pressure has been controlled in accordance with the program sections shown in FIGS. 3, 5, or 7, the program is terminated and is executed again at a defined time.

Figure 4:
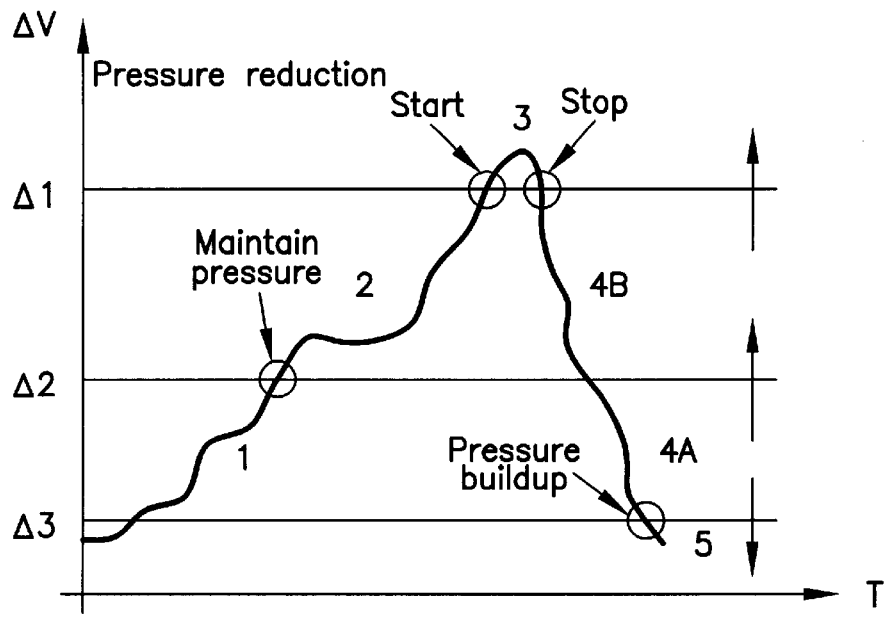
FIG. 4 shows an action of the first exemplary embodiment of the braking force distribution control system while the vehicle is driving through the curve with reference to a time diagram.

The operation controlling brake pressure in the rear-axle brakes with the vehicle in a curve is depicted in the context of a first exemplary embodiment in FIGS. 3 and 4. The rear-axle brakes are regulated individually in proportion to the front wheels. If the difference between the velocity of one rear wheel and the fastest front wheel exceeds a certain limit value, the pressure in that rear wheel is limited. If a second limit value above the first limit value is exceeded, a reduction pulse series occurs. The reduction pulse series continues until the value again falls below the second limit value. A pressure reduction occurs after the value falls below the first limit value, minus a hysteresis.

A preferred implementation of this procedure is outlined in FIG. 3 using the example of the left rear wheel. A corresponding program section is executed for the right rear wheel. In the first step 200, the differential velocity $\Delta$VL between the velocity of the fastest front wheel VmaxVA and the velocity VHL of the left rear wheel is obtained. The subsequent step 202 checks whether the differential velocity is greater than a limit value $\Delta$2. If not, step 204 checks whether the inlet valve marker is set. The meaning of this marker will be described below. If the marker is not set, i.e. if the system is located in the rising portion of the curve of FIG. 4, below threshold $\Delta$3 (region 1), pressure is continuously built up in accordance with step 206. This is accomplished, in the preferred exemplary embodiment of a hydraulic braking system, because the inlet valve of the corresponding wheel brake is open. After step 206, execution continues as shown in FIG. 2.

If step 204 has indicated that the marker is set, i.e. that threshold $\Delta$2 has already been exceeded, the subsequent step 208 queries whether the differential velocity is greater than $\Delta$3, which is quantitatively less than $\Delta$2. If the differential velocity is less than or equal to $\Delta$3, i.e. if it has dropped below that value (region 5 in FIG. 4), then according to step 210 pressure is built up, to equalize the pressure with the brake pressure at the front wheels, by pulsed activation of the inlet valve with a defined pulse series, and in the following step 212 the marker is reset. After step 212, execution continues as shown in FIG. 2.

If the differential velocity is greater than $\Delta$3 (region 4A in FIG. 4), then as defined by step 214, pressure is maintained by closing the inlet valve. After step 214, execution continues as shown in FIG. 2.

If step 202 has indicated that the different exceeds limit value $\Delta$2, the marker is set in step 216. Query step 218 then checks whether the difference exceeds a quantitatively greater limit value $\Delta$1. If not (region 2 or 4B in FIG. 4), brake pressure is maintained in accordance with step 214. If it was ascertained in step 218 that the difference is greater than limit value $\Delta$1 (region 3 in FIG. 4), brake pressure is reduced in the subsequent step 220. This is accomplished, in the preferred exemplary embodiment, by activating the corresponding outlet valve with pulses of defined length. After step 220, execution continues as shown in FIG. 2.

The manner of operation of the exemplary embodiment depicted in FIG. 3 is illustrated in the time diagram of FIG.

4, which depicts the change in velocity difference ΔV over time. The velocity difference is at first below limit value Δ3. This means that pressure is being built up through the open inlet valve. The velocity difference increases accordingly until the second threshold Δ2 is exceeded. In this case, in accordance with the description presented above, the brake pressure is maintained by closing the inlet and outlet valves. In the example depicted in FIG. 4, the difference continues to rise. At a certain point in time, the difference exceeds the highest limit value Δ1. This leads to a pulsed pressure reduction by activation of the outlet valve. The velocity difference decreases. When the value once again falls below limit value Δ1, the pressure reduction is stopped and brake pressure is maintained. The brake pressure maintenance phase lasts until the value once again falls below threshold value Δ3. If the value falls below this threshold value, pressure is built up again by opening the inlet valve.

As a result of the procedure just described, while the vehicle is driving in a curve the brake pressures at the rear wheel brakes are established separately for each wheel, on the basis of the difference between the velocity of the respective rear wheel and of the fastest front wheel.

Figure 6:
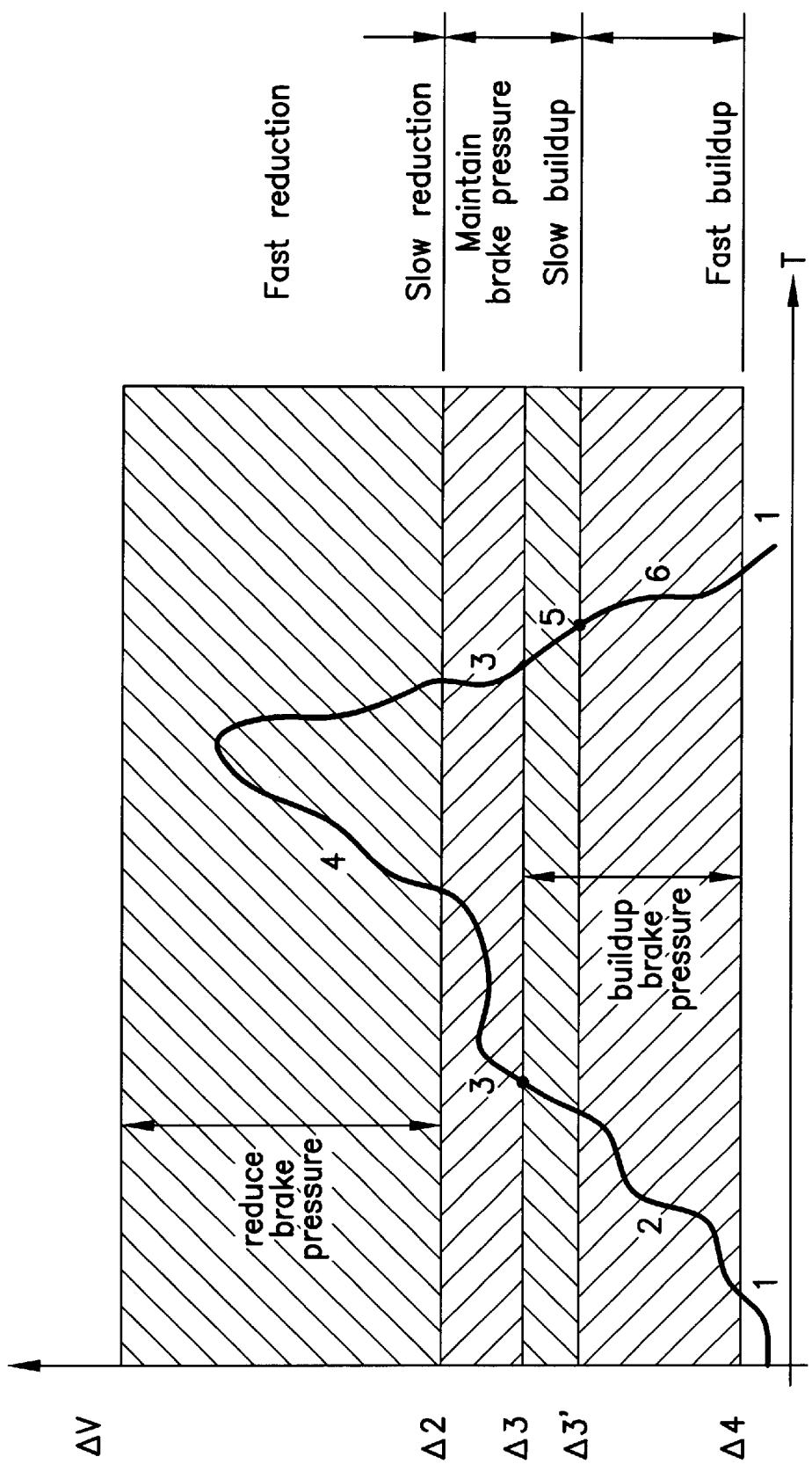
FIG. 6 shows an action of the second exemplary embodiment of the braking force distribution control system while the vehicle is driving through the curve correspondingly in the time diagram.

In the context of a second exemplary embodiment which is depicted in FIGS. 5 and 6, instead of fixed thresholds a dynamic regulation operation in a slip band is used. This is done by maintaining the wheel pressure in a defined band of the velocity difference. Below that band a buildup occurs, and above it a reduction. The buildup and reduction are, in this context, dynamic, i.e. the further away the control variable (velocity difference) is located in the pressure buildup or pressure reduction, the faster the corresponding pressure buildup or reduction takes place.

FIG. 5 depicts a flow chart which describes an implementation of the second exemplary embodiment as a computer program. The flow chart in FIG. 5 is presented using the example of a right rear wheel. A corresponding program section also exists for the left rear wheel. In the first step 300, the velocity difference ΔVR between the fastest front wheel VmaxVA and the velocity of the right rear wheel VHR is calculated. The first query step 302 checks whether the velocity difference exceeds the quantitatively smallest limit value Δ4. If not (region 1 in FIG. 6), according to step 304 a marker (described below) is set, and in step 306 pressure is built up continuously through the open inlet valve. The program then continues as shown in FIG. 2. If the velocity difference is greater than limit value Δ4, query step 308 checks whether it is greater than limit value Δ3. If not, i.e. if the velocity difference is located between limit values Δ3 and Δ4, step 310 checks whether the marker is set. If it is not set, the system is in the region of increasing difference (cf. region 2 in FIG. 6), so that pressure is built up in accordance with step 306.

If the marker is set, i.e. if the difference is decreasing, step 312 queries whether the value has dropped below threshold Δ3', which lies slightly below threshold Δ3. If this is the case (region 6 in FIG. 6), in step 314 pressure is built up by pulsed activation of the inlet valve. The pulse lengths depend on the value of the velocity difference. They decrease as the velocity difference increases. Thus, the pressure buildup becomes slower as the velocity difference becomes greater and as the velocity difference is brought closer to the setpoint band. The program then continues as shown in FIG. 2.

If the velocity difference according to step 312 is greater than threshold value Δ3' (region 5 in FIG. 6), the wheel pressure is maintained in step 316, the inlet and outlet valves being closed. The program then continues as shown in FIG. 2.

If the velocity difference has also exceeded limit value Δ3 (step 308; regions 3 and 4 in FIG. 6), then according to step 318 the marker is set. Step 320 then checks whether the velocity difference exceeds limit value Δ2. If not, the velocity difference is located in the defined setpoint band (region 3 in FIG. 6), and the pressure is thus maintained according to step 316. If the velocity difference has exceeded threshold value Δ2, then pressure is reduced in the subsequent step 322. This is accomplished by activating an outlet valve with pulses of defined length. Here again, the pulse lengths depend on the value of the velocity difference; in this case the pulse lengths increase as the velocity difference increases. Thus, as the velocity difference becomes greater, the brake pressure reduction takes place more quickly, while it is accomplished more slowly in the vicinity of the setpoint band. The program then continues as shown in FIG. 2.

In an exemplary embodiment, limit values Δ2 and Δ3 coincide, so that what is defined there is not a setpoint band but a fixed setpoint. Limit value Δ3' constitutes a hysteresis between the rising and falling difference. In an exemplary embodiment, this hysteresis is dispensed with, so that limit value Δ3' coincides with value Δ3.

The manner of operation of the second exemplary embodiment of the means according to the present invention for attaining the object is illustrated in the time diagram of FIG. 6. Here again, the change in velocity difference is plotted against time. It is assumed that first of all the velocity difference lies below limit value Δ3. The brake pressure increase then takes place as quickly as possible, by completely opening the inlet valve. As a result, the velocity difference between front and rear wheels increases. Once limit value Δ3 has been exceeded, the velocity difference enters the setpoint range, so that the brake pressure is maintained by closing the inlet and outlet valves. If the velocity difference exceeds the upper limit value Δ2 of the setpoint band, brake pressure is reduced. Pulsed activation of the outlet valve causes the brake pressure reduction to occur more quickly as the wheel velocity difference increases. In this context, the off time between the pulses can become almost zero, so that the outlet valve can be continuously open. If the value once again falls below limit value Δ2 after the velocity difference has decreased, pressure is maintained. If the value falls below limit value Δ3', pressure is built up again. The pressure buildup becomes faster as the velocity difference decreases. If the value falls below limit value Δ4, the brake pressure buildup is performed as quickly as possible, with the inlet valve open.

The procedure known in the prior art with the vehicle traveling straight ahead is depicted as a flow chart in FIG. 7. Here, in the first step 400, the slowest rear wheel is selected by selecting the minimum value of the velocities of the left and right rear wheels. In the subsequent step 402, the difference ΔV between the velocity of the fastest front wheel VmaxVA and the velocity of the slowest rear wheel VminHA is obtained, and in the subsequent step 404 the pressure at both rear wheel brakes is controlled on the basis of the magnitude of difference ΔV. In this context, when the value falls below a setpoint band for the difference, or below a setpoint, pressure is built up; pressure is reduced if it is exceeded; and within the setpoint band pressure is maintained.

Figure 8A:
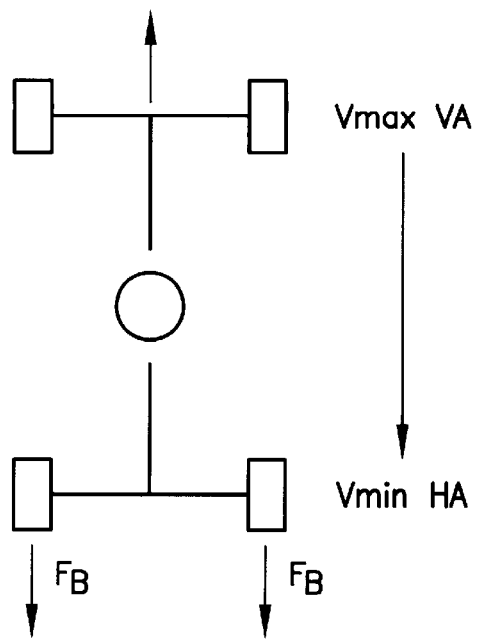
FIG. 8a shows forces and moments acting on the vehicle while driving straight ahead and in the curve.

FIG. 8 depicts the advantageous effects of the means according to the present invention for attaining the object. FIG. 8a shows the case of the vehicle traveling straight ahead, in which the velocity difference between the slowest rear wheel is regulated to a setpoint by controlling the brake pressure in both rear wheels. This results in identical braking forces on both sides.

Figure 8B:
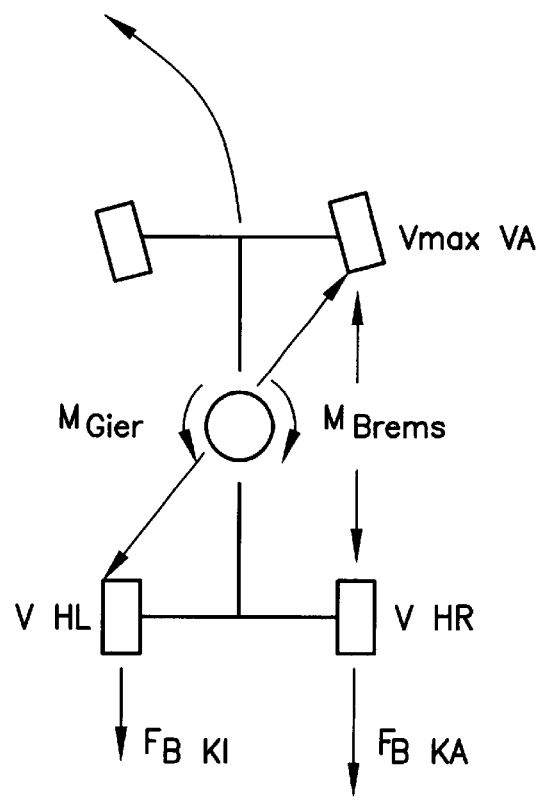
FIG. 8b shows forces and moments acting on the vehicle while driving straight ahead and in the curve.

FIG. 8b shows the case of the vehicle traveling in a curve, in which, according to the present invention, individual regulation of the rear wheel brakes is performed with reference to the fastest front wheel. In this context, a pressure difference automatically occurs between the wheel on the outside of the curve and the wheel on the inside of the curve, along with different braking forces FBKI and FBKA. Because of the resulting greater braking force FBKA at the wheel on the outside of the curve, a backward-rotating moment MBrems occurs, which counteracts the yaw moment MGier.

Since the wheel on the outside of the curve is performing lateral guidance, it must be monitored more sensitively than the wheel on the inside of the curve in terms of a limit value for the velocity difference as compared with the fastest front wheel. Thus, threshold values Δ1 to Δ4 (or Δ1 to Δ3 in the first exemplary embodiment) are selected as a function of the direction of the curve, the setpoint band (or hysteresis) in which the brake pressure is maintained being smaller for the wheel on the outside of the curve than for the one on the inside. The brake pressure buildup and reduction thus take place more sensitively (buildup in response to greater difference, reduction in response to smaller difference) at the wheel on the outside of the curve than at the wheel on the inside of the curve.

The means according to the present invention for attaining the object were described using the example of a pressure-medium braking system. The corresponding means are also used in conjunction with a braking system with brake application by electric motor. Here, instead of braking pressure, braking force or braking moment is built up, reduced, or maintained by the activation of electric motors.

In addition to the determination of a difference between the velocities of the rear wheels and the fastest front wheel, in another exemplary embodiment the difference is determined with respect to another front wheel velocity, for example an average of the velocities of the front wheels.

What is claimed is:

1. A method for controlling a braking force distribution in a vehicle between front wheels and rear wheels, comprising the steps of:
   for each oft the rear wheels, determining a braking force for a respective wheel of the rear wheels such that a difference between a first velocity of the respective wheel and a second velocity of at least one of the front wheels assumes at least one predefined value; and
   modifying the braking force as a function of the at least one predefined value and the difference between the first velocity and the second velocity.

2. The method according to claim 1, further comprising the step of:
   while the vehicle is traveling in a curve, determining the braking force for each of the rear wheels.

3. The method according to claim 1, further comprising the steps of:
   determining a second velocity of a fastest wheel of the front wheels as a function of a first respective velocity of each of the front wheels;
   for each of the rear wheels, determining a velocity difference as a function of a comparison between the second velocity and a second respective velocity of each of the rear wheels; and
   one of adjusting and maintaining a pressure as a function of a comparison between the velocity difference and at least one predetermined value.

4. The method according to claim 3, further comprising the steps of:
   determining at least one slip band as a function of the comparison between the second respective velocity of each of the rear wheels and the second velocity;
   if the at least one slip band is within a predetermined band, maintaining the braking force;
   if the at least one slip band is below the predetermined band, increasing the braking force; and
   if the at least one slip band is above a predetermined band, reducing the braking force.

5. The method according to claim 3, further comprising the steps of:
   dynamically changing an adjustment rate of the braking force; and increasing the adjustment rate with an increasing distance from a predetermined point for the velocity difference.

6. The method according to claim 3, further comprising the steps of:
   providing at least one predetermined limit value; and
   if the pressure exceeds the at least one predetermined limit value, immediately adjusting the pressure.

7. The method according to claim 1, wherein the braking system includes one of:
   a hydraulically controlled braking system, a pneumatically controlled braking system, an electrically controlled braking system, and an electric brake application braking system.

8. The method according to claim 1, further comprising the steps of:
   while the vehicle is traveling in a curve,
      maintaining a first brake pressure for a first wheel of the rear wheels within a first setpoint band, the first wheel of the rear wheels being on an outer side of the curve; and
      maintaining a second brake pressure for a second wheel of the rear wheels within a second setpoint band, the second wheel of the rear wheels being on an inner side of the curve;
      wherein the first setpoint band being smaller than the second setpoint band.

9. The method according to claim 1, further comprising the steps of:
   while the vehicle is traveling in a curve,
      reducing a brake pressure for a first wheel of the rear wheels if an upper limit brake pressure is exceeded with a first hysteresis, the first wheel being on an outer side;
      increasing the brake pressure for the first wheel if the brake pressure goes under a lower limit brake pressure with a second hysteresis;
      reducing a brake pressure for a second wheel of the rear wheels if the upper limit brake pressure is exceeded with a third hysteresis, the second wheel being on an inner side of the curve; and
      increasing the brake pressure for the second wheel if the brake pressure goes under the lower limit brake pressure with a fourth hysteresis,
      wherein the first hysteresis is smaller than the third hysteresis, and the second hysteresis is smaller than the fourth hysteresis.

10. A method for controlling a braking force distribution in a vehicle between front wheels and rear wheels, comprising the steps of:
    if the vehicle is traveling straight ahead, controlling a braking force for all of the rear wheels together; and
    if the vehicle is traveling in a curve, individually controlling the braking force for each of the rear wheels.

11. The method according to claim 10, further comprising the steps of:
   determining a first velocity of a fastest wheel of the front wheels as a function of a first respective velocity of each of the front wheels;
   for each of the rear wheels, determining a velocity difference as a function of comparison between the first velocity and a second respective velocity of each of the rear wheels; and
   one of adjusting and maintaining a pressure as a function of a comparison between the velocity difference and at least one predetermined value.

12. The method according to claim 11, further comprising the steps of:
   determining at least one slip band as a function of a comparison between the second respective velocity of each of the rear wheels and the first velocity;
   if the at least one slip band is within a predetermined band, maintaining the braking force;
   if the at least one slip band is below the predetermined band, increasing the braking force; and
   if the at least one slip band is above a predetermined band, reducing the braking force.

13. The method according to claim 11, further comprising the steps of:
   dynamically changing an adjustment rate of the braking force; and increasing the adjustment rate with an increasing distance from a predetermined point for the velocity difference.

14. The method according to claim 11, further comprising the steps of:
   providing at least one predetermined limit value; and
   if the pressure exceeds the at least one predetermined limit value, immediately adjusting the pressure.

15. The method according to claim 10, wherein the braking system includes one of:
   a hydraulically controlled braking system, a pneumatically controlled braking system, an electrically controlled braking system, and an electric brake application braking system.

16. The method according to claim 10, further comprising the steps of:
   while the vehicle is traveling in a curve,
      maintaining a first brake pressure for a first wheel of the rear wheels within a first setpoint band, the first wheel of the rear wheels being on an outer side of the curve; and
      maintaining a second brake pressure for a second wheel of the rear wheels within a second setpoint band, the second wheel of the rear wheels being on an inner side of the curve;
      wherein the first setpoint band is smaller than the second setpoint band.

17. The method according to claim 10, further comprising the steps of:
   while the vehicle is traveling in a curve,
      reducing a brake pressure for a first wheel of the rear wheels if an upper limit brake pressure is exceeded with a first hysteresis, the first wheel being on an outer side;
      increasing the brake pressure for the first wheel if the brake pressure goes under a lower limit brake pressure with a second hysteresis;
      reducing a brake pressure for a second wheel of the rear wheels if the upper limit brake pressure is exceeded with a third hysteresis, the second wheel being on an inner side of the curve; and
      increasing the brake pressure for the second wheel if the brake pressure goes under the lower limit brake pressure with a fourth hysteresis;
      wherein the first hysteresis is smaller than the third hysteresis, and the second hysteresis is smaller than the fourth hysteresis.

18. A device for controlling a braking force distribution in a vehicle between front wheels and rear wheels, comprising:
   an electronic control unit receiving at least one signal corresponding to a respective velocity of each of the front wheels and the rear wheels, wherein the electronic control unit includes:
   an arrangement controlling for each oft the rear wheels individually a braking force for a respective wheel of the rear wheels as a function of at least one predefined value and a difference between a first velocity of the respective wheel and a second velocity of at least one of the front wheels.

* * * * *

UNITED STATES PATENT AND TRADEMARK OFFICE
CERTIFICATE OF CORRECTION

PATENT NO.    : 6,322,167 B1                                                          Page 1 of 1
DATED         : November 27, 2001
INVENTOR(S)   : Pruhs, Uwe et al.

It is certified that error appears in the above-identified patent and that said Letters Patent is hereby corrected as shown below:

Column 3,
Line 56, change "using of a" to -- using a --

Column 7,
Line 41, change "oft" to -- of --

Column 8,
Line 65, delete "and"
Line 67, change "wheels." to -- wheels; -- and add
    -- determining a first velocity of a fastest wheel of the front wheels as a function of a first respective velocity of each of the front wheels;
        for each of the rear wheels, determining a velocity difference as a function of a comparison between the first velocity and a second respective velocity of each of the rear wheels; and
        one of adjusting and maintaining a pressure as a function of a comparison between the velocity difference and at least one predetermined value. --

Column 10,
Line 38, change "oft" to -- of --

Signed and Sealed this

Seventeenth Day of December, 2002

JAMES E. ROGAN
*Director of the United States Patent and Trademark Office*